Nov. 4, 1969
R. F. TURNER
3,476,645
FUEL SEGREGATION LOADING ARRANGEMENT
IN NUCLEAR FUEL ELEMENTS
Filed Oct. 22, 1968
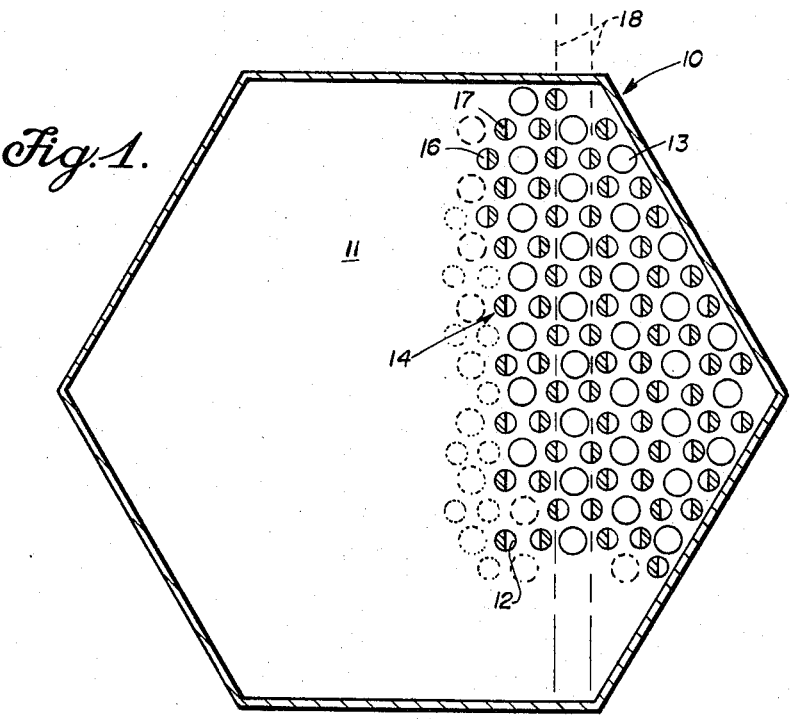
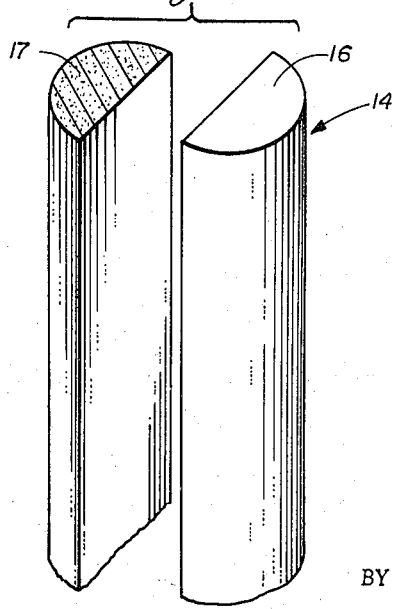
INVENTOR.
RICHARD F. TURNER
BY
ATTORNEY

United States Patent Office 3,476,645
Patented Nov. 4, 1969

3,476,645
FUEL SEGREGATION LOADING ARRANGEMENT IN NUCLEAR FUEL ELEMENTS
Richard F. Turner, San Diego, Calif., assignor to the United States of America as represented by the United States Atomic Energy Commission
Filed Oct. 22, 1968, Ser. No. 769,661
Int. Cl. G21c 3/04
U.S. Cl. 176—71                                              2 Claims

ABSTRACT OF THE DISCLOSURE

Fuel rods for a thorium-uranium fuel cycle reactor made up as two approximately half-circular cylindrical cross-section segments, one containing fissile material and the other fertile material. The two segments together form a complete cylindrical fuel rod, and a plurality of the rods are mounted in the fuel block of a fuel element in rows, the rods in each row being aligned and oriented such that the planes of separation between the segments of the respective rods are in a common plane. The arrangement facilitates simplified separation of the fissile and fertile fuels for reprocessing by slicing of the block along the common planes of segment separation of the respective rows of rods. Relatively great homogeneity of fuel and improved heat transfer are also provided.

BACKGROUND OF THE INVENTION

The invention described herein was evolved in the course of, or under, contract AT(04–3)–633 with the United States Atomic Energy Commission.

In nuclear reactors operating on the thorium-uranium fuel cycle it is desirable that fuel elements be removed from the reactor when a predetermined desired exposure has been achieved and the uranium be separated from the thorium, the fission products, the diluent, and the cladding (if present). In addition it is important that the bred $U^{233}$ may be separated from the $U^{235}$ because of the difference in reactivity worth. The separated uranium, i.e., the nonfissioned uranium as well as the uranium bred in the thorium, is then available to be refabricated into new fuel elements and subsequently recycled in the same reactor core or in another reactor. Such separation of uranium isotope is facilitated by segregating the fissile fuel from the fertile fuel in the initial loading of the reactor core. Subsequently, the segregated fuel types may be expeditiously chemically reprocessed to separate the uranium therefrom.

Heretofore various arrangements have been devised to segregate the fissile and fertile fuels in the loading of a reactor core. In one type of segregation arrangement the two fuel types are provided in a mixed bed of particles respectively having two distinct particle diameter ranges such that separation of the fuel types may be accomplished by sieving during reprocessing. However, it is generally a desirable feature of a fuel element that the fuel particles be bonded together and to the graphite body of the element in order to prevent release of fuel in case of a fracture. The foregoing type of segregation arrangement is not applicable when the fuel particles are thus bonded, since the particles are not in condition to be sieved apart during reprocessing. Accordingly, other types of fuel segregation arrangements have been devised which are applicable to bonded fuel units. For example, separate bonded, fissile and fertile fuel rods respectively may be embedded in the body of a fuel element in an appropriate predetermined geometry. Separation of the fuel types for reprocessing is then accomplished by coring, or otherwise removing, the separate fissile rods and fertile rods from the fuel element body. However, where separate fissile and fertile rods are thus employed to facilitate fuel segregation, homogeneity of fuel in the fuel element is limited, and moreover the rod removal process is relatively difficult.

In an alternative segregation arrangement capable of providing increased fuel homogeneity, a large number of closely spaced fuel columns are provided in the fuel element body with each column being comprised of a plurality of axially alternating fissile and fertile fuel pellets. The planes of separation between the pellets of adjacent columns are aligned in common axially spaced planes. Consequently, separation of fuel types may be effected by slicing the body of the fuel element along the common planes of separation. It will be appreciated that this arrangement suffers from the disadvantage that increased homogeneity of fuel is obtained at the expense of increased processing and handling during separation. In this regard, increased fuel homogeneity is obtained by increasing the number of fissile and fertile pellets in the respective fuel columns. As a result the number of slices to be made and the number of separate pieces to be handled during the separation process are correspondingly increased.

Aside from the foregoing disadvantage, the axially alternating fissile and fertile fuel pellet arrangement has a limited efficiency of heat transfer between the pellets and coolant channels which extend through the fuel element body parallel to the fuel columns. More particularly, during reactor operation, fission heat is generated predominately in the fissile pellets. Consequently, since heat flow is radial, the surface portions of the coolant channels radially opposite the fissile pellets comprise substantially the total heat transfer surface in the fuel element, i.e., the surface portions radially opposite the fertile pellets do not contribute materially to the transfer of heat.

SUMMARY OF THE INVENTION

The general object of the present invention is to provide a segregation arrangement for bonded fuel in a nuclear reactor fuel element which while facilitating separation of fissile and fertile fuels with minimized processing and handling, yet provides relatively great fuel homogeneity and efficiency of heat transfer in the fuel element.

In the accomplishment of the foregoing, the segregation arrangement provides fuel rods, each formed by two approximately half-circular cylindrical cross-section segments fit together to define a right circular cylinder. The segments are separated at a plane parallel to the cylindrical rod axis, and one segment contains fissile material, such as enriched uranium, while the other segment contains fertile material, such as thorium.

The fuel rods as thus provided are mounted in the fuel block of a fuel element in rows, the rods in each row being aligned and oriented such that the planes of separation between the segments of the respective rods are in a common plane. The common separation planes of the respective rows of rods are parallel, and the fissile segments of one row of rods are preferably adjacent the fissile segments of the next row of rods. By virtue of this arrangement, in the reprocessing of fuel the fuel block may be sliced or fractured along the common planes of separation between segments, thereby separating the two types of fuel.

As a particularly important feature of the fuel segregation arrangement in accordance with the present invention, compared to an axially alternating fissile and fertile pellet arrangement of the type previously discussed herein having a similar degree of fuel homogeneity, the number of planes of separation which must be sliced to separate the fuel types for reprocessing is materially reduced.

A further advantage of the arrangement of the present invention over the existing axially alternating pellet arrangement is that heat transfer between the fuel rods and fluid coolant channels extending through the fuel block parallel to the rods occurs over the entire surface of each coolant channel, rather than only over portions thereof opposite the fissile fuel. In this regard, with the rods formed of semi-cylindrical fissile and fertile segments, heat flows to the coolant channels radially directly from the fissile segments and also through the fertile segments along the entire length of the channels.

DESCRIPTION OF THE DRAWINGS

FIGURE 1 is a plan sectional view of a hexagonal fuel element embodying the fuel segregation arrangement of the present invention.

FIGURE 2 is an exploded perspective view on an enlarged scale of one of the segmented fuel rods of the arrangement.

DETAILED DESCRIPTION OF THE PREFERRED EMBODIMENT

Referring now to FIGURE 1 in detail, a fuel segregation arrangement in accordance with the present invention will be seen to be embodied in a fuel element 10 of hexagonal cross-section which is particularly well suited to use in a high temperature gas cooled reactor utilizing a thorium-uranium fuel cycle. The instant segregation arrangement is such as to provide a high degree of fuel homogeneity while facilitating fuel separation with minimized handling and processing, and to provide efficient heat transfer in the fuel element, as compared to the previously mentioned prior art segregation arrangements including that of columns of axially alternating fissile and fertile fuel pellets. More particularly, the fuel element 10 includes a body or block 11 of moderating material, preferably graphite, having a plurality of rows of fuel holes 12 and fluid coolant channels 13 extending therethrough parallel to the block axis in a uniform distribution. In accordance with the particularly salient aspects of the fuel segregation arrangement, fuel rods 14, each formed by two approximately semi-cylindrical segments 16 and 17, as best shown in FIGURE 2, fit together to define a right circular cylinder, are embedded in the fuel holes 12. The segments of each rod are separated at a plane parallel to the axis thereof, and one segment 16 contains fissile material, such as enriched uranium, while the other segment 17 contains fertile material, such as thorium. It is important to note that the rods 14 in the respective rows of fuel holes 12 are oriented with the planes of segment separation lying in common parallel spaced planes 18 through the fuel block. The fissile segments of the rods in each row are disposed on one side of the corresponding common plane 18, while the fertile segments are disposed on the other side thereof. In addition, like type fuel segments of the rods in adjacent rows are preferably disposed in adjacent relationship, i.e., fissile segments of a row are disposed adjacent fissile segments of the next row and fertile segments of a row are disposed adjacent fertile segments of the next row.

With the fuel segregation arrangement provided as just described, it will be appreciated that separation of fuel types for reprocessing subsequent to a predetermined period of reactor operation may be readily accomplished by slicing the fuel block 11 along the common planes 18. The resulting slabs defined between the common planes thus contain a single type of rod segment, i.e., either fissile segments 16, or fertile segments 17. In the case of enriched uranium and thorium being originally employed respectively as the segments 16 and 17, the segments 16 are processed to recover any remaining $U^{235}$, while the segments 17 are processed to recover the bred $U^{233}$ for reactor recycle operation.

It is to be noted that the fuel segregation arrangement enables a relatively high degree of fuel homogeneity to be attained in the fuel element 10 while requiring a reduced number of slices through the block 11 to effect fuel separation for reprocessing as compared to previous segregation arrangements such as columns of axially alternating fissile and fertile fuel pellets. For example, consider a typical hexagonal fuel element having 21 rows of 31 inch long fuel holes in parallel across the width thereof. The spacing between 0.45 inch diameter fuel holes is typically ¼ inch. Thus with fuel rods formed by semi-cylindrical fissile and fertile segments filling the fuel holes in accordance with the segregation arrangement of the present invention, the maximum spacing between semi-cylindrical fissile segments is approximately ¾ inch. For a comparable homogeneity with the axially alternating pellet arrangement, the pellets are consequently no more than ¾ inch long. As a result, the number of common planes of separation between fissile and fertile pellets in the 31 inch fuel holes is approximately 40, as compared to the 21 common planes of separation between the semi-cylindrical fuel segments (one plane per row of fuel rods). It will be therefore appreciated that for comparable homogeneity, the segregation arrangement of the present invention reduces the number of slices and pieces to handle during the separation stage of reprocessing to substantially half those required with the axially alternating fuel pellet arrangement.

It is of further importance to note that with the fuel segregation arrangement of the present invention heat transfer within the fuel block 11 is superior to that for the axially alternating pellet arrangement because a greater fraction of the surface of the coolant channels 13 is operable to remove heat generated in the fuel block 11. In this regard, during reactor operation heat is generated primarily in the fissile fuel, and heat flow from fuel embedded in the fuel holes 12 to the coolant channels 13 is radial. Consequently, with the axially alternating pellet arrangement the effective area for heat transfer is limited substantially to the surface portions of the coolant channels directly radially opposite the fissile pellets. With the arrangement of the present invention, heat flows radially directly from the fissile segments 16 and also through the fertile segments 17 in transferring to the fuel block 11. The transfer from the fuel block to the coolant channels 13 hence occurs along the full length of the channels rather than only portions of the channel length.

Considering now one specific example of fuel rods 14 in accordance with the present invention for a 1000 mwe. high temperature gas cooled reactor having a 3600 fuel element capacity, the segments 16 and 17 are fabricated to form cylindrical rods having a 0.45 inch diameter and 30 inch length. The segments are formed by mixing standard pyrocarbon coated or silicon carbide coated fuel particles (600 microns diameter) with pulverized graphite filler and a carbonizing binder such as furfuryl alcohol. The mixture is placed in steel molds and carbonized in a well known manner to form the segments. The fuel content after fabrication of each of the segments is as follows:

|  | Segment 16 | Segment 17 |
| --- | --- | --- |
| $U^{233}$ recycled, gms | 0 | 1.88 |
| $U^{235}$ carried with $U^{233}$, gms | 0 | 0.06 |
| $Th^{232}$, gms | 0 | 83.5 |
| Fresh $U^{235}$, gms | 1.87 | 0 |

I claim:
1. A fuel segregation arrangement for a nuclear reactor fuel element comprising a moderating fuel block, and a plurality of right cylindrical fuel rods each formed by two substantially semi-cylindrical segments fit together at a plane of separation parallel to the rod axis to define a right cylinder, one of said segments containing fissile type fuel and the other of said segments containing fertile type fuel, said rods embedded in said block in parallel spaced rows with the rods of the respective rows oriented with the planes of segment separation lying in common parallel spaced planes and the like fuel type segments of the rods in each row disposed on the same side of the corresponding one of said common planes, whereby separation of the respective types of fuel for reprocessing may be effected by slicing said block along said common planes.

2. A fuel segregation arrangement according to claim 1, further defined by said rods being oriented with the like fuel type segments of the rods in adjacent rows disposed in adjacent relationship.

References Cited

UNITED STATES PATENTS

| | | | |
|---|---|---|---|
| 2,992,174 | 7/1961 | Edlund et al. | 176—18 |
| 3,141,827 | 7/1964 | Iskenderian | 176—17 |
| 3,154,471 | 10/1964 | Radkowsky | 176—17 |
| 3,208,912 | 9/1965 | Jaye et al. | 176—17 X |
| 3,293,135 | 12/1966 | Jaye et al. | 176—17 |
| 3,341,420 | 9/1967 | Sevy | 176—71 X |
| 3,356,586 | 12/1967 | Watson et al. | 176—71 X |
| 3,396,078 | 8/1968 | Visner | 176—17 |

BENJAMIN R. PADGETT, Primary Examiner

M. J. SCOLNICK, Assistant Examiner

U.S. Cl. X.R.

176—17, 78, 90